US009671131B2

(12) United States Patent
Cohen

(10) Patent No.: US 9,671,131 B2
(45) Date of Patent: Jun. 6, 2017

(54) HYDRONIC AIR HEATER

(71) Applicant: MESTEK, INC., Westfield, MA (US)

(72) Inventor: Kenneth W. Cohen, Fort Lee, NJ (US)

(73) Assignee: MESTEK, INC., Westfield, MA (US)

( * ) Notice: Subject to any disclaimer, the term of this patent is extended or adjusted under 35 U.S.C. 154(b) by 519 days.

(21) Appl. No.: 14/153,287

(22) Filed: Jan. 13, 2014

(65) Prior Publication Data

US 2014/0197243 A1    Jul. 17, 2014

Related U.S. Application Data

(60) Provisional application No. 61/752,570, filed on Jan. 15, 2013.

(51) Int. Cl.
| *F24H 3/08* | (2006.01) |
| *F24H 6/00* | (2006.01) |
| *F24H 9/20* | (2006.01) |
| *F24D 3/00* | (2006.01) |
| *F24D 5/00* | (2006.01) |
| *F24D 15/02* | (2006.01) |
| *F24D 19/00* | (2006.01) |
| *F24D 19/10* | (2006.01) |
| *F24H 1/08* | (2006.01) |

(Continued)

(52) U.S. Cl.
CPC ............... *F24H 6/00* (2013.01); *F24D 3/00* (2013.01); *F24D 5/00* (2013.01); *F24D 15/02* (2013.01); *F24D 19/0097* (2013.01); *F24D 19/1009* (2013.01); *F24D 19/1084* (2013.01); *F24H 9/2007* (2013.01); *F24H 9/2064* (2013.01)

(58) Field of Classification Search
CPC ... F24D 3/00; F24D 5/00; F24D 15/02; F24D 19/0097; F24D 19/1009; F24D 11/005; F24D 11/004; F24D 7/00; F23D 3/02; F24H 6/00; F24H 9/2007; F24H 9/2064; F24H 1/08; F24H 1/445; F24H 3/12; F24H 8/00
USPC .................... 237/50, 62, 59, 57; 432/90, 91
IPC ............ F24H 6/00,9/14, 9/02, 1/08, 1/48, 3/08, 3/12; F24D 3/02, 3/10, 5/04, 15/02, 19/08, 11/00
See application file for complete search history.

(56) References Cited

U.S. PATENT DOCUMENTS 990,755  A * 4/1911  Lembke ................. F24H 3/006
                                                    126/108
1,319,654 A * 10/1919  Lee ......................... F24H 3/08
                                                    126/104 A
(Continued)

FOREIGN PATENT DOCUMENTS

| DE | WO 2009131492 A1 * 10/2009 | ............... F24H 1/08 |
| JP | 03294747 A * 12/1991 | |
| SE | WO 9109257 A1 * 6/1991 | ............... F24H 6/00 |

*Primary Examiner* — Gregory Huson
*Assistant Examiner* — Daniel E Namay
(74) *Attorney, Agent, or Firm* — Grogan, Tuccillo & Vanderleeden, LLP

(57) ABSTRACT

A hydronic air heater includes a frame assembly defining an enclosure, an inlet air damper formed in a wall of the enclosure and providing a means of ingress for ambient air, a closed heat transfer loop disposed within the enclosure, and a blower assembly disposed within the enclosure. The heat transfer loop includes a boiler for heating a fluid, a pump for circulating the fluid within the loop and a heating coil for receiving the heated fluid from the boiler. The blower assembly is configured to draw air into the enclosure through the inlet air damper and through the heating coil whereby heat from the fluid within the heating coil is transferred to the air.

19 Claims, 3 Drawing Sheets

(51) Int. Cl.
*F24H 3/12* (2006.01)
*F24D 5/02* (2006.01)
*F24D 19/08* (2006.01)

(56) References Cited

U.S. PATENT DOCUMENTS

| | | | | |
|---|---|---|---|---|
| 1,606,629 | A * | 11/1926 | Halbrook | F22B 33/18 126/20 |
| 2,193,735 | A * | 3/1940 | Mueller | 116/277 |
| 2,369,044 | A * | 2/1945 | Hallinan | F24H 9/2064 126/110 R |
| 2,735,381 | A * | 2/1956 | Breed | A21B 1/24 432/172 |
| 3,068,854 | A * | 12/1962 | Freeman | F24D 5/00 126/109 |
| 4,945,977 | A * | 8/1990 | D'Agaro | B60H 1/00207 165/43 |
| 5,535,944 | A * | 7/1996 | Knowles | F02G 5/04 237/12.3 A |
| 5,617,504 | A * | 4/1997 | Sciacca | F02B 63/04 219/492 |
| 6,612,267 | B1 * | 9/2003 | West | F24D 3/08 122/13.3 |
| 7,663,256 | B2 * | 2/2010 | Yuri | F02G 5/04 123/41.01 |
| 8,849,463 | B2 * | 9/2014 | Hopkins | F04D 25/166 700/276 |
| 2002/0108745 | A1 * | 8/2002 | Kimura | B60H 1/025 165/236 |
| 2003/0213362 | A1 * | 11/2003 | Cataldo | B01D 47/06 95/228 |
| 2006/0191265 | A1 * | 8/2006 | Kang | F25B 27/02 60/659 |
| 2006/0266348 | A1 * | 11/2006 | Jauch | F23D 91/02 126/110 C |
| 2008/0022707 | A1 * | 1/2008 | Cho | F25B 13/00 62/238.1 |
| 2009/0208392 | A1 * | 8/2009 | Klus | C04B 11/032 423/171 |
| 2011/0014061 | A1 * | 1/2011 | Hopkins | F04D 25/166 417/3 |
| 2014/0020637 | A1 * | 1/2014 | Yamin | F24F 5/0096 122/32 |
| 2015/0292434 | A1 * | 10/2015 | Yamanaka | F02G 5/02 60/670 |

* cited by examiner

HYDRONIC AIR HEATER

CROSS-REFERENCE TO RELATED APPLICATIONS

This application claims the benefit of U.S. Provisional Application Ser. No. 61/752,570, filed on Jan. 15, 2013, which is herein incorporated by reference in its entirety.

FIELD OF THE INVENTION

The present invention relates generally to HVAC systems and, more particularly, to a packaged, rooftop hydronic air heater.

BACKGROUND OF THE INVENTION

HVAC systems are designed to maintain indoor air quality and provide thermal space conditioning. HVAC is important in the design of industrial and office buildings where safe and healthy building conditions are regulated with respect to temperature and humidity, using fresh air from outdoors.

Central heating is often used in cool climates to heat buildings. Central heating systems contain a boiler, furnace or heat pump to warm water, steam or air in a central location such as a furnace room in a home or a mechanical room in large buildings. These systems also contain either duct work in forced air systems or piping to distribute a heated fluid to radiators or a heat exchanger to transfer this heat to the air.

The use of water as the heat transfer medium is known as hydronics. In a hydronic heating system, water within is heated in a boiler and discharged into piping which carries it to a heat exchanger or heating coil. Air is drawn through the coil and is warmed. The water within the coil, now at a lower temperature due to the transfer of heat to the incoming or surrounding air, is returned to the boiler for reheating. Especially in cool climates, hydronic heating systems are typically installed as central heating systems within the interior of the building. Often times, however, this is undesirable due to space limitations, complexity of installation and the inability to easily retrofit new or upgraded systems into an existing building.

While certain heating systems can be deployed on the rooftop of buildings (known as packaged rooftop units), thereby providing for ease of installation/retrofitting, hydronic heating systems have typically not been used on the roof because of the need to bring water piping to the roof and concerns about operation at subfreezing temperatures.

In view of the above, there is a need for a packaged, rooftop hydronic air heater that is capable of consistent and efficient operation at subfreezing temperatures.

SUMMARY OF THE INVENTION

It is an object of the present invention to provide a hydronic air heater.

It is another object of the present invention to provide a hydronic air heater that has a small footprint.

It is another object of the present invention to provide a hydronic air heater that can be easily installed on the rooftop of existing buildings.

It is another object of the present invention to provide a hydronic air heater having increased accuracy and efficiency compared to existing devices.

It is another object of the present invention to provide a hydronic air heater capable of operation at extremely cold temperatures.

It is yet another object of the present invention to provide a hydronic air heater that provides exceptional temperature accuracy and efficiency over widely variable ambient conditions.

These and other objects are achieved by the present invention.

According to one embodiment of the present invention, a hydronic air heater is provided. The heater includes a frame assembly defining an enclosure, an inlet air damper formed in a wall of the enclosure and providing a means of ingress for ambient air, a closed heat transfer loop disposed within the enclosure, and a blower assembly disposed within the enclosure. The heat transfer loop includes a boiler for heating a fluid, a pump for circulating the fluid within the loop and a heating coil for receiving the heated fluid from the boiler. The blower assembly is configured to draw air into the enclosure through the inlet air damper and through the heating coil whereby heat from the fluid within the heating coil is transferred to the air.

According to another embodiment of the present invention, a packaged, rooftop hydronic air heater is provided. The heater includes a substantially hermetically sealed enclosure having an air inlet, a closed heating loop within said enclosure having at least one boiler for heating a heat transfer fluid, a pump for moving the heat transfer fluid within the loop, and a heat exchanger, and an air mover within the enclosure and configured to draw air into the enclosure through the air inlet and through the heat exchanger whereby heat from the heat transfer fluid is transferred to the air to warm the air. The heater further includes a heat recovery tube configured to recover heat from heat generating components within the enclosure and to exhaust the recovered heat adjacent to the heat exchanger.

According to yet another embodiment of the present invention, a method of heating a structure is provided. The method includes the steps of providing an enclosure having an air inlet, a closed heating loop including a boiler, a pump and a heating coil with the enclosure, and a blower assembly with the enclosure, controlling the boiler and the pump to provide a heated fluid to the heating coil, controlling the blower assembly to draw air into the enclosure and past the heating coil to warm the air for distribution to the structure, and recovering heat lost from the boiler and the pump and providing the recovered heat to the heating coil.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
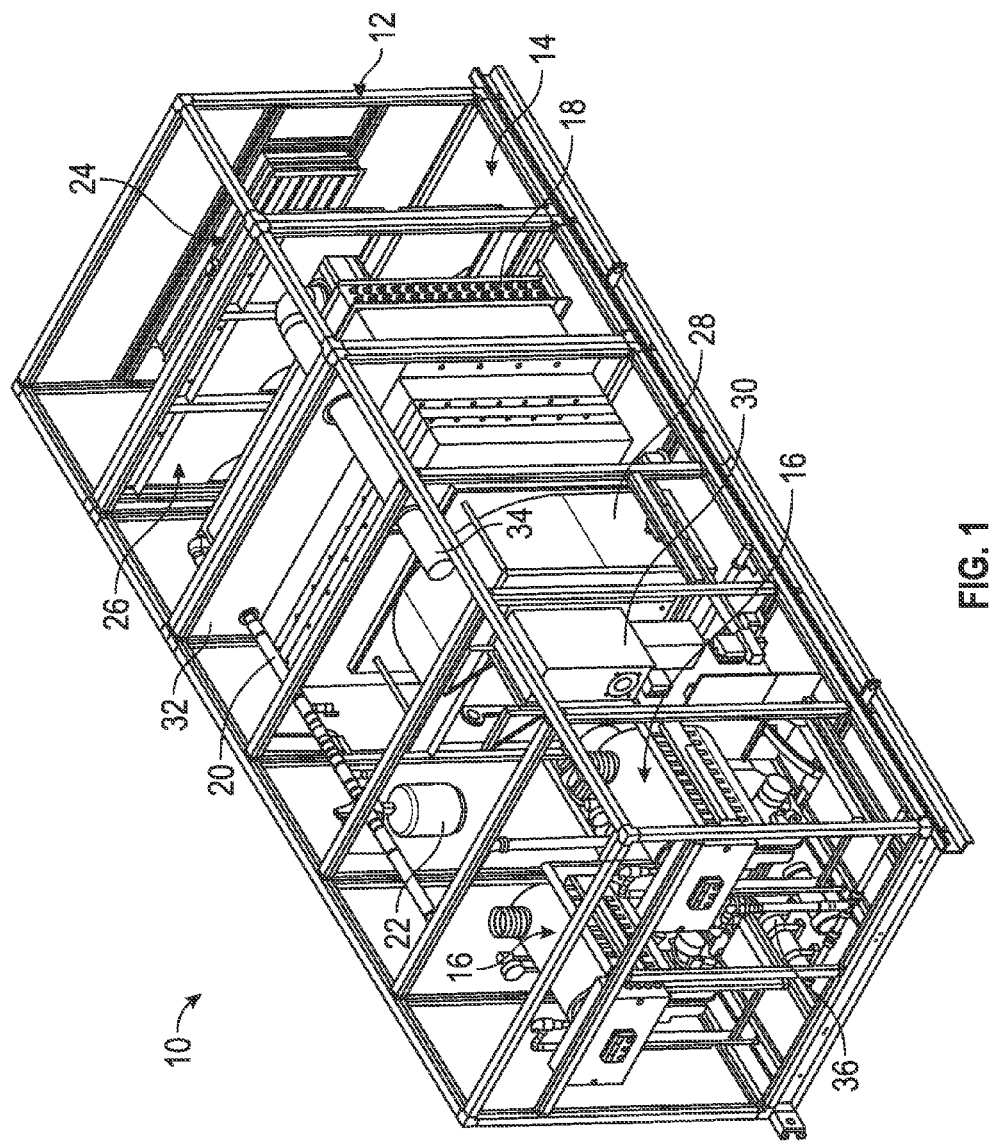
FIG. 1 is a perspective view of a hydronic air heater according to an embodiment of the present invention.

Referring to FIG. 1, the present invention relates to a packaged hydronic air heater 10. As shown therein, the hydronic air heater includes a frame assembly 12 defining a substantially rectangular enclosure 14 encased by panels (not shown), which hermetically seal the enclosure 14. The hydronic air heater 10 includes one or more boilers 16 disposed within the enclosure 14. In the preferred embodiment, the hydronic air heater 10 has two boilers 16, although more or fewer boilers may be utilized without departing from the broader aspects of the present invention. The boilers 16 are fluidly coupled to a heating coil 18 via pipelines 20, which forms a closed-loop system whereby a fluid is heated by the boilers 16, pumped to the heating coil 18 by a constant speed pump (not shown), and eventually returned to the boilers 16 for reheating, as discussed in detail below. An expansion tank 22 within the closed-loop heating system maintains system pressure as the fluid within the system is heated and expands and contracts, and protects the system from excessive pressure.

In the preferred embodiment, the boilers 16 are low mass, gas-fired condensing boilers, having a low heat capacity and high efficiency, and which utilize burner technology that ensures low emissions of both CO and NOx. The fluid within the heating system to be heated by the boilers 16 is a water/glycol mixture. As a result of providing the fluid as a water/glycol mixture rather than pure water, freezing of the fluid at extreme cold temperatures may be avoided, as discussed in detail below.

With further reference to FIG. 1, at one end of the enclosure 14, an inlet air damper 24 is operatively connected to the frame assembly 12 and provides a means of ingress for ambient air. A filter 26 is positioned within the enclosure adjacent to the inlet air damper 24 and is configured to remove particulates entrained in the air entering the enclosure 14. The hydronic air heater 10 also includes a blower assembly 28 disposed behind the heating coil 18. As will be readily appreciated, the blower assembly 28 is configured to pull air to be conditioned into the enclosure 14 through the inlet air damper 24, as discussed in detail below. A variable-frequency drive (VFD) 30 is electrically coupled to the blower assembly 28 and controls the speed of the blower assembly 28. As shown in FIG. 1, the VFD is separately housed within an additional, dedicated enclosure.

Notably, the downstream end of the enclosure 14 is substantially isolated from the upstream end of the enclosure by a partition 32. This partition 32 substantially ensures that the only flow of air between the upstream end of the enclosure 14 (where air enters the enclosure) and the downstream end of the enclosure 14 (where the heat-generating components are housed) is through the blower assembly 28 and a heat recovery tube 34, discussed hereinafter.

As discussed in detail below, the hydronic air heater 10 of the present invention also includes a control system having a control unit configured to control operation of the boilers 16 and the pump, as well as the VFD 30 and, thus, the blower assembly 28 in dependence upon a desired set point temperature as indicated by a user. In connection with this, and discussed hereinafter, the heater 10 includes a plurality of fluid temperature sensors for measuring a temperature of the fluid within the closed loop, at the inlet and outlet of the coil 18, as well as a plurality of air temperature sensors for measuring a temperature of the air upstream and downstream of the coil 18. These sensors are configured to communicate the detected temperatures so that operation of the air heater may be optimized.

In operation, the water/glycol mixture within the closed-loop is heated by the boilers 16 and pumped to the heating coil 18. At the same time, the blower assembly 28, in response to a signal from the VFD 30, draws ambient air into the enclosure 14, through the filter 26 and past the heating coil 18 wherein heat is transferred from the fluid within the heating coil 18 to the incoming air. The now heated air may then be routed into the building on which the hydronic air heater 10 is deployed via ductwork. The fluid within the heating coil 18 is recirculated to the boilers 16 for reheating.

By coupling the low heat capacity, high efficiency condensing boilers with the low heat capacity hydronic system, rapid response to changes in variables may be realized, providing for rapid settling to set point conditions.

Figure 2:
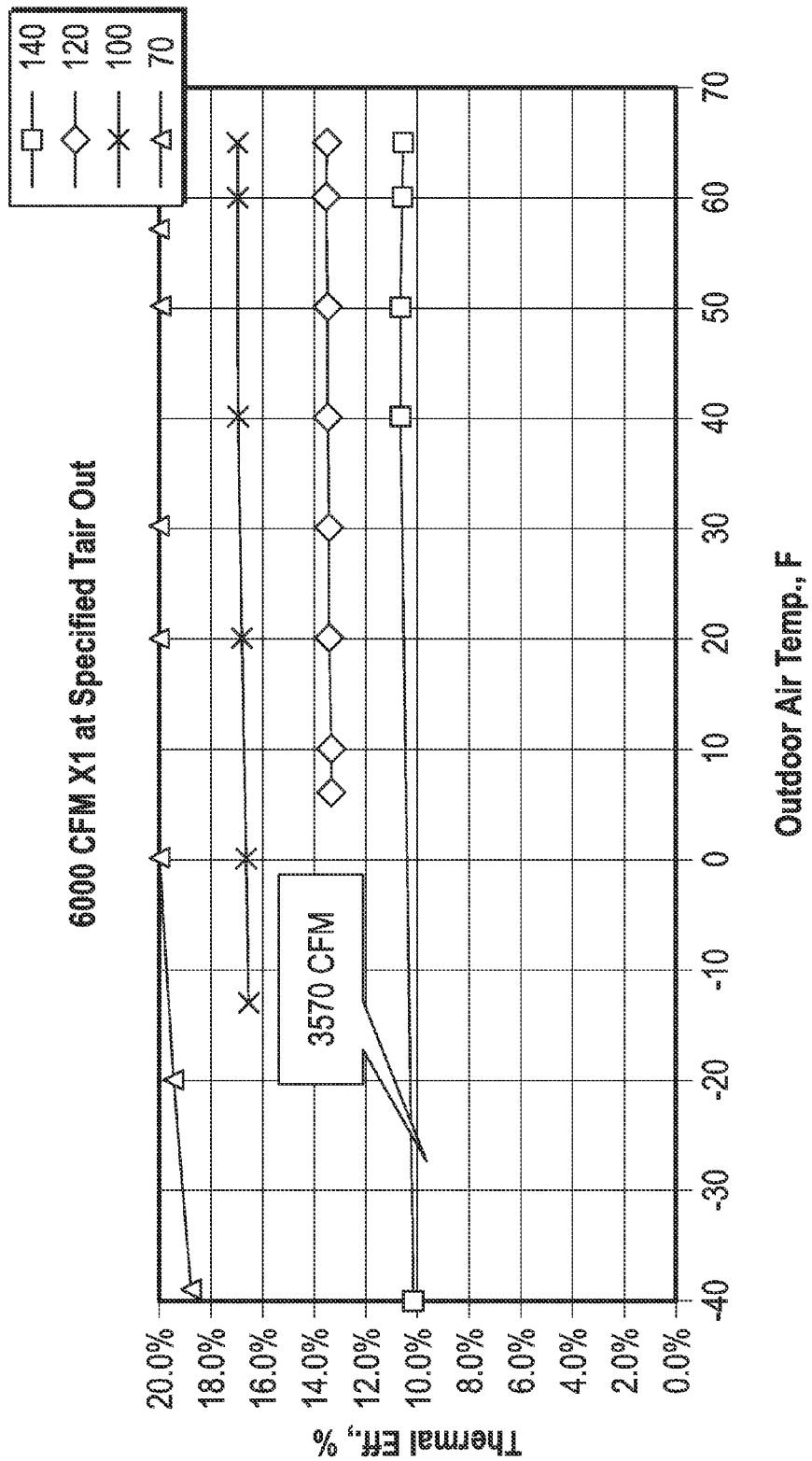
FIG. 2 is a graph illustrating the thermal efficiency of boilers of the hydronic air heater of FIG. 1 at various ambient temperatures.

Importantly, the heating coil 18 design is implemented as a counter flow unit to provide for sufficient temperature difference in the incoming and exiting fluid temperatures to ensure boiler thermal efficiencies greater than 90% at air set point temperatures under approximately 140° F. This coil design ensures consistent temperature across its entire surface, which eliminates air stratification over the entire air flow regime. Example efficiencies for the hydronic air heater 10 are shown in FIG. 2.

Figure 3:
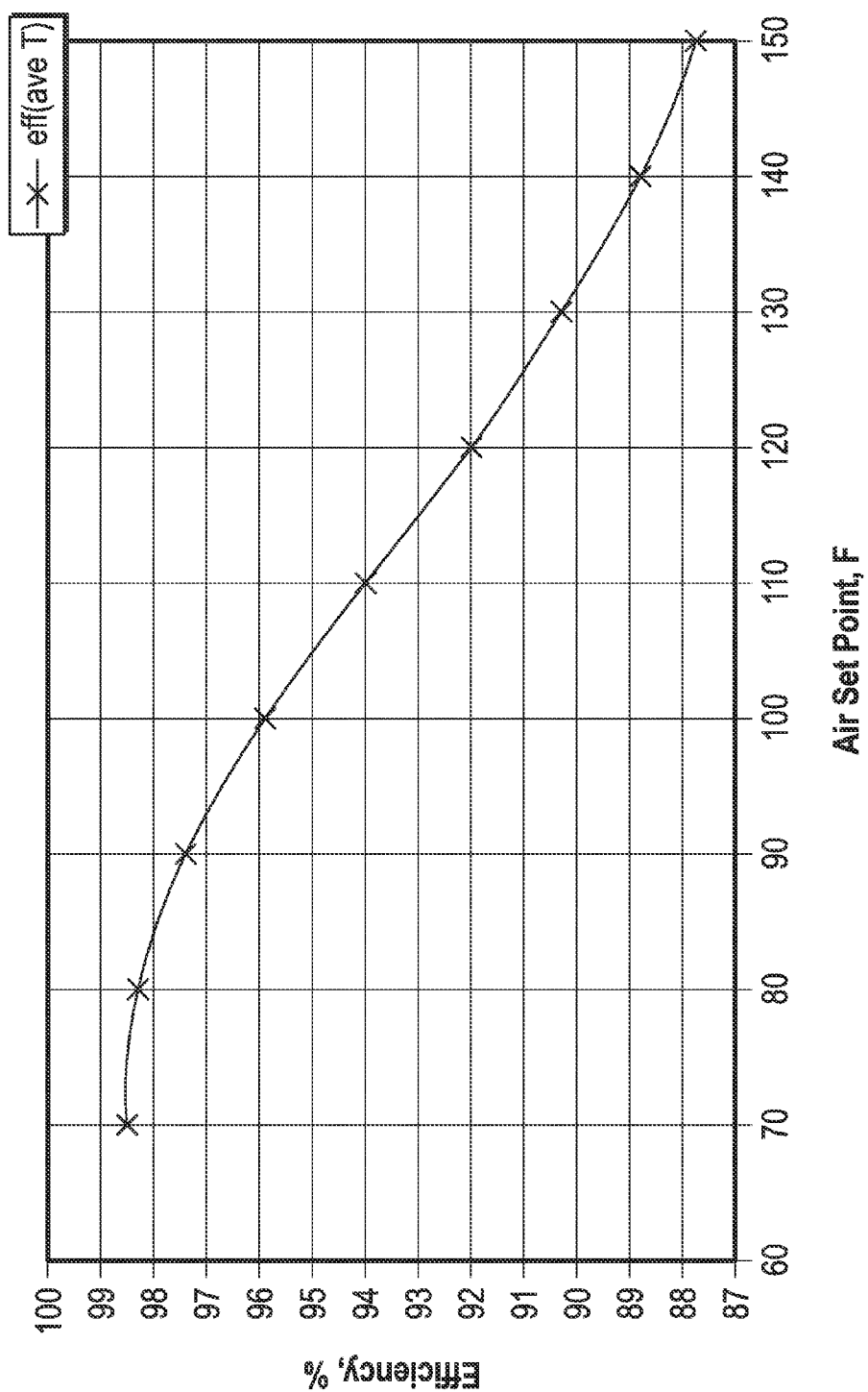
FIG. 3 is a graph illustrating efficiency as a function of air set point temperature, for the hydronic air heater of FIG. 1.

The unique configuration of the hydronic air heater 10 of the present invention results in efficiency being approximately independent of load. Thus, efficiency can be plotted as a function of air set point temperature, as shown in FIG. 3.

It is an important aspect of the present invention that efficiency of the hydronic air heater 10 is increased by recovering heat from components whose thermal efficiencies are less than 100%, such as from boiler jacket losses, hydronic circulator pump, VFD and power transformer. Recovering heat is enabled by the provision of the heat recovery tube 34, as alluded to above. In particular, heat lost from the components in the downstream end of the enclosure 14, is recovered by the heat recovery tube 34. This 'waste' heat is drawn into the heating coil 18 in the upstream end of the enclosure 14. This recovery of heat lost by the components in the downstream end of the enclosure 14 reduces the required boiler BTU input by an amount approximately equivalent to the thermal losses (i.e., less energy must to be provided to meet heating demands).

As will be readily appreciated, the compact, packaged nature of the hydronic air heater 10 reduces foot print, allowing it to be installed in tight areas or on the rooftop of buildings. The hydronic air heater 10 also overcomes limitations of existing hydronic air heating systems, which typically are not used 'on the roof' because of the need to bring water piping to the roof and concerns about operation at freezing temperatures. In particular, in contrast to existing systems, the hydronic air heater 10 of the present invention is a self-contained, integrated system that requires only gas, air ducting, and an electrical connection. In view of these unique design elements, the hydronic air heater 10 can operate and cold start at temperatures down to approximately −40° F.

The ability of the hydronic air heater 10 to operate at extremely cold temperatures is further aided by the use of the water/glycol mixture that will not freeze at cold temperatures as the heat transfer fluid within the closed loop. Moreover, the heater 10 is hermetically sealed. The only dynamic components in the heater 10 are the pumps, which are also hermetically sealed. In addition to the above, the boiler condensate trap 36 is designed to completely drain when the boilers 16 are turned off. This prevents freezing condensate in the condensate trap 36 during an interruption in power, which would interfere with boiler operation.

As alluded to above, the VFD 30 controls the speed of the blower assembly 28. While these devices typically cannot operate below about −15° F., the VFD is contained within an enclosure, as shown in FIG. 1, that removes and supplies heat as necessary to allow operation at temperature extremes.

Another important aspect of the present invention is the control system. In particular, the integration of modulating boilers 16 and the variable speed blower assembly 28, controllable by the control system, results in high accuracy and efficiency as well as providing unique capabilities to the heater 10. The flow rate of the fluid through the piping of the closed loop system is known, from factory calibration of the constant speed pump. Thus, by measuring the temperature difference across the coil 18 (via temperature sensors, not shown), the net BTU can be determined. From this, air flow can be calculated by measuring the air temperature difference across the coil via 18 air temperature sensors (not shown). Importantly, this capability eliminates the tedious processes typically necessary to determine air flow, as has heretofore been required.

If the air temperature difference across the coil 18 exceeds the boilers' ability to maintain set point temperature, the air flow may be reduced (BTU reduced) to maintain the set point. Notably, the high precision of the temperature and fan speed control provides for set point temperature delivered to the duct system during the start cycle, preventing wide fluctuations during this period.

Importantly, the integration of the components and electronics, as described above, results in a hydronic air heater that provides exceptional accuracy and efficiency over widely variable ambient conditions. The heater 10 provides for improved comfort by supplying air at a constant temperature over a 10:1 turn down range (ambient temperature change). This allows those components utilizing the contained air to operate more accurately and efficiently.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A hydronic air heater, comprising:
   a frame assembly defining an enclosure;
   a partition within said enclosure, said partition substantially isolating an upstream compartment of said enclosure from a downstream compartment of said enclosure, said upstream compartment and said downstream compartment being adjacent to one another;
   an inlet air damper formed in a wall of said enclosure and providing a means of ingress for ambient air into said upstream compartment of said enclosure;
   a closed heat transfer loop disposed within said enclosure, said heat transfer loop including a boiler for heating a fluid, said boiler being located in said downstream compartment, a pump for circulating said fluid within said loop and a heating coil for receiving said heated fluid from said boiler, said heating coil being located in said upstream compartment;
   a blower assembly disposed within said enclosure and being configured to draw air into said enclosure through said inlet air damper and through said heating coil whereby heat from said fluid within said heating coil is transferred to said air; wherein said downstream compartment of said enclosure houses heat-generating components including at least said boiler; and
   a heat recovery tube extending from said downstream compartment to said upstream compartment and fluidly connecting said downstream compartment to said upstream compartment, said heat recovery tube being configured to recover heat lost from said heat-generating components in said downstream compartment and to provide said lost heat to said heating coil in said upstream compartment.

2. The hydronic air heater of claim 1, wherein:
   said fluid is a water/glycol mixture.

3. The hydronic air heater of claim 1, further comprising:
   a variable frequency drive electrically connected to said blower assembly and being configured to control a speed of said blower assembly.

4. The hydronic air heater of claim 1, wherein:
   said boiler is a low mass condensing boiler.

5. The hydronic air heater of claim 3, further comprising:
   a control unit in electrical communication with said variable frequency drive, said pump and said boiler and configured to control operation of said boiler, said pump and said blower assembly in dependence upon an input set point temperature.

6. The hydronic air heater of claim 5, wherein:
   said control unit is configured to determine an optimal air flow rate through the heating coil to meet said set point temperature in dependence upon a measured fluid temperature difference across the heating coil and a measured air temperature difference across the heating coil.

7. The hydronic air heater of claim 1, wherein:
   said heater is capable of operation and cold starting at temperatures as low as approximately −40° F.

8. The hydronic air heater of claim 1, further comprising:
   an air filter positioned downstream of said inlet air damper and upstream from said blower assembly.

9. The hydronic air heater of claim 1, wherein:
   said hydronic air heater is an integrated unit that does not require an external supply of fluid.

10. A packaged, rooftop hydronic air heater, comprising:
    an enclosure having an upstream compartment and a downstream compartment separated by a partition, said enclosure having an air inlet in said upstream compartment;
    a closed heating loop within said enclosure having at least one boiler in said downstream compartment for heating a heat transfer fluid, a pump for moving said heat transfer fluid within said loop, and a heat exchanger in said upstream compartment;
    an air mover within said enclosure and configured to draw air into said enclosure through said air inlet and through said heat exchanger whereby heat from said heat transfer fluid is transferred to said air to warm said air; and
    a heat recovery tube having an inlet within said downstream compartment and an outlet in said upstream compartment and providing a passageway from said downstream compartment to said upstream compartment, said heat recover tube being configured to recover heat from heat generating components within said downstream compartment and to exhaust said recovered heat adjacent to said heat exchanger in said upstream compartment.

11. The hydronic air heater of claim 10, further comprising:
    a circulator pump.

12. The hydronic air heater of claim 10, wherein:
said heating fluid is a water/glycol mixture.

13. The hydronic air heater of claim 10, further comprising:
- a variable frequency drive electrically connected to said air mover and being configured to control a speed of a motor of said air mover.

14. The hydronic air heater of claim 13, further comprising:
- an integrated control unit in electrical communication with said variable frequency drive, said pump and said at least one boiler and configured to control operation of said at least one boiler, said pump and said air mover in dependence upon a heating demand.

15. The hydronic air heater of claim 14, wherein:
said control unit is configured to determine an optimal air flow rate through said heat exchanger to meet said heating demand in dependence upon a measured fluid temperature difference across the heat exchanger and a measured air temperature difference across the heat exchanger.

16. The hydronic air heater of claim 1, wherein:
said heater is capable of operation and cold starting at temperatures as low as approximately −40° F.

17. A method of heating a structure, said method comprising the steps of:
providing an enclosure having an upstream compartment and a downstream compartment separated by a partition, an air inlet in said upstream compartment, a closed heating loop including a boiler, said boiler in said downstream compartment, a pump, and a heating coil within said upstream compartment, and a blower assembly configured to draw air into said upstream compartment through said air inlet and through said heating coil;
controlling said boiler and said pump to provide a heated fluid to said heating coil;
controlling said blower assembly to draw air into said enclosure and past said heating coil to warm said air for distribution to said structure via an air duct; and
recovering heat lost from said boiler and said pump and providing said recovered heat to said heating coil through a heat recovery tube extending from said downstream compartment to said upstream compartment.

18. The method according to claim 17, wherein:
said step of controlling said blower assembly includes controlling a speed of said blower assembly to provide an optimized air flow rate through said heating coil to meet a heating demand for said structure in dependence upon a measured fluid temperature difference across said heating coil and a measured air temperature difference across said heating coil.

19. The method according to claim 17, wherein:
said enclosure is an integrated, packaged unit configured for installation on a rooftop of said structure; and
wherein said enclosure only requires an electrical supply and a supply of gas for operation.

\* \* \* \* \*